United States Patent [19]

Aldrich

[11] 4,115,955
[45] Sep. 26, 1978

[54] PANEL AND HINGE ASSEMBLY

[76] Inventor: Darrell L. Aldrich, 800 Park Dr., Owatonna, Minn. 55060

[21] Appl. No.: 820,634

[22] Filed: Aug. 1, 1977

[51] Int. Cl.² .......................... E05D 15/58; B60J 7/18
[52] U.S. Cl. ...................................... 49/261; 49/465; 296/137 B
[58] Field of Search ............. 296/137 B; 49/465, 397, 49/261; 16/128 R, 171, 175

[56] References Cited

U.S. PATENT DOCUMENTS

| | | | |
|---|---|---|---|
| 2,556,062 | 6/1951 | Buehrig | 296/137 B |
| 2,752,014 | 6/1956 | Watson | 49/397 |
| 3,913,971 | 10/1975 | Green | 296/137 B |
| 3,955,848 | 5/1976 | Lutz et al. | 296/137 B |
| 4,067,605 | 1/1978 | Green et al. | 296/137 B |

Primary Examiner—Joseph F. Peters, Jr.
Assistant Examiner—Norman L. Stack, Jr.
Attorney, Agent, or Firm—Burd, Braddock & Bartz

[57] ABSTRACT

A panel and hinge assembly that can be installed in the rigid roof of a vehicle such as an automobile or a van to permit entry of air and light from the top of the vehicle. A window unit of the assembly can be opened for ventilation and can be closed in weathertight relationship relative to a frame. The window unit is opened by pivotal movement with respect to the hinge assembly about a remote axis to permit clearing relationship of the window unit and a window seal. The hinge assembly permits easy removal of the window unit to provide an unobstructed opening on the roof of the vehicle.

16 Claims, 6 Drawing Figures

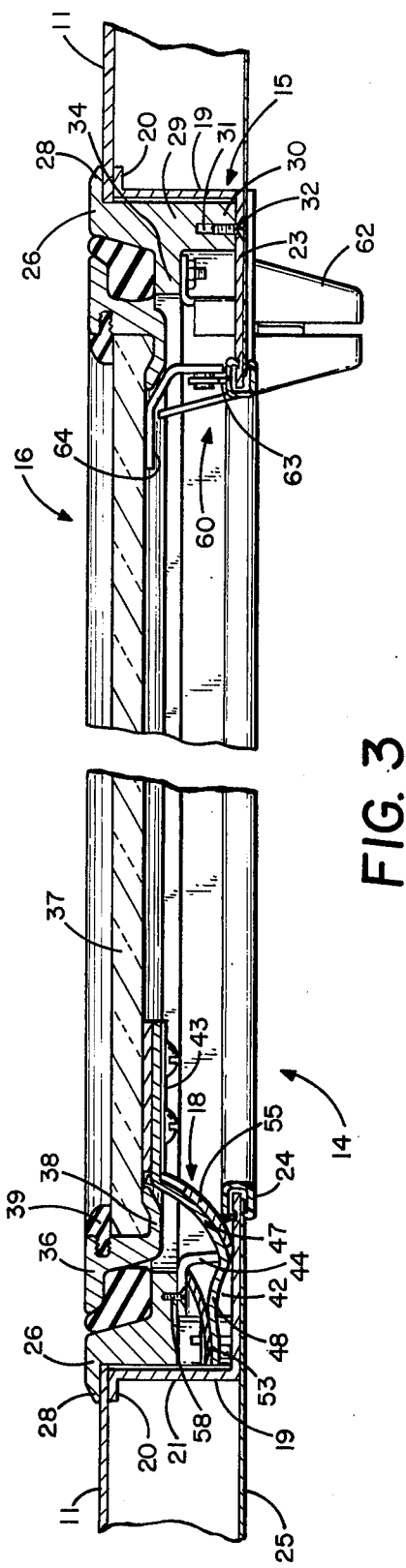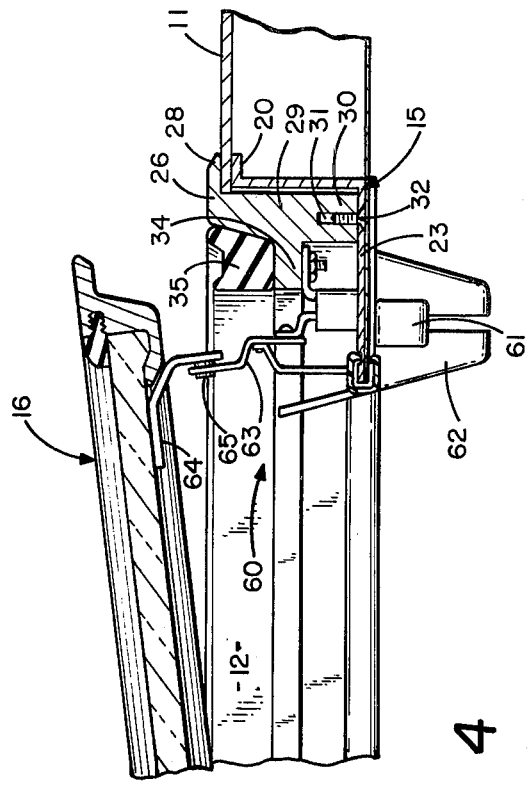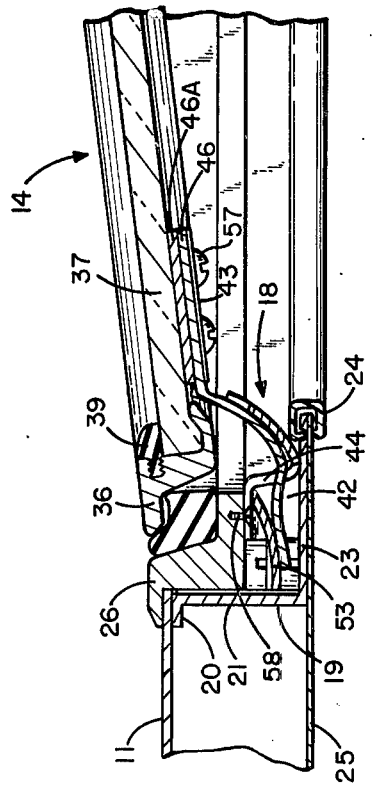
FIG. 3
FIG. 4

PANEL AND HINGE ASSEMBLY

BACKGROUND OF THE INVENTION

Roof panel assemblies on vehicles are popular for providing and supplementing ventilation in the vehicle and, when a window unit is included, for providing sunlight from the top of the vehicle. It is important that the panel or window unit be capable of being closed in weathertight relationship to the roof and preferably when the panel or window unit is opened, the entire unit is moved away from the weather stripping or sealing structure so as not to cause wear and eventual damage to it. In some structures, the entire window unit is removable for maximum ventilation. See U.S. Pat. No. 3,979,148 to Martin. In such cases, it is desirable that the hinge assembly connecting the window unit to the vehicle roof permit quick and easy detachment and reattachment.

SUMMARY OF THE INVENTION

The invention relates to a panel assembly and a hinge assembly therefore particularly adaptable for installation in the roof of a vehicle such as an automobile or a van. The panel assembly includes a panel which can be comprised of a translucent or transparent window unit to permit entry of light to the top of the vehicle. The window unit can be opened to supplement or provide ventilation. When closed, the window unit is weathertight.

The hinge assembly permits opening of the window unit by pivotal movement about an axis remote from the assembly. Thus when moved between the open and closed configurations, the window unit does not bear upon the weather seal. The hinge assembly includes first and second hinge members, one being connected to the window unit and the other to the car roof. The first and second hinge members are coupled for sliding engagement relative to one another upon movement of the window unit between the open and closed configurations. The hinge members slide relative to one another about an arcuate path having imaginary axis remote from the window unit such that the window unit is lifted off the weather seal when moving from the closed to the open position.

IN THE DRAWINGS

FIG. 3 is a sectional view of the panel and hinge assembly of FIG. 1 taken along the line 3—3 thereof;

FIG. 4 is a sectional view of the panel and hinge assembly of FIG. 2 taken along line 4—4 thereof;

DESCRIPTION OF PREFERRED EMBODIMENT

Figure 1:
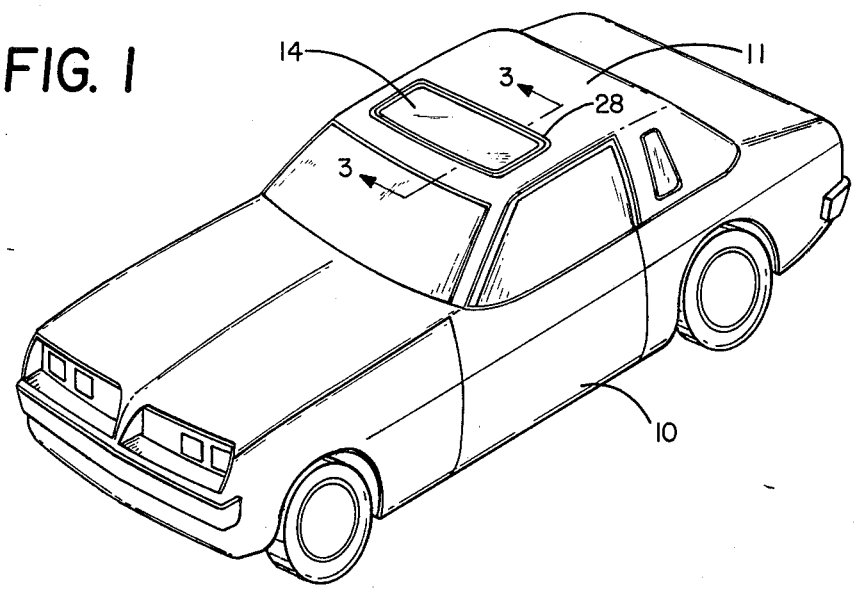
FIG. 1 is a perspective view of an automotive type vehicle having a panel and hinge assembly according to the present invention in a closed configuration.
Figure 2:
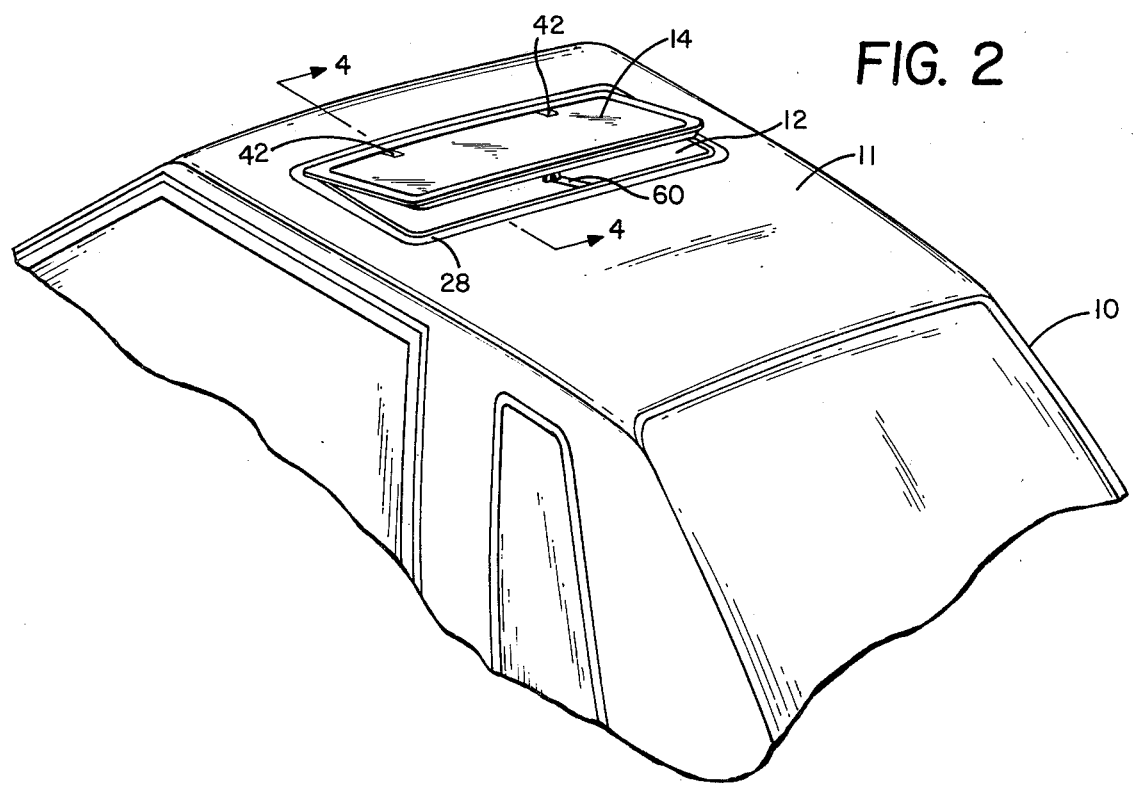
FIG. 2 is an enlarged fragmentary view of a portion of the vehicle of FIG. 1 showing the panel and hinge assembly in the open configuration.

Referring to the drawings, there is shown in FIGS. 1 and 2, a car having a relatively rigid roof 11 with an opening 12. A panel and hinge assembly for the invention, indicated generally at 14, is installed in opening 12 of roof 11, shown in a closed configuration in FIG. 1 and in an open configuration in FIG. 2. In the closed configuration of FIG. 1, panel and hinge assembly 14 is weathertight with the hinges unexposed. In the open configuration of FIG. 2, ventilation is provided to the interior of car 10 through opening 12. Panel and hinge assembly 14 is particularly adaptable for installation in the roof of an automotive vehicle but it is usuable for other applications where a panel that can be opened is needed, for example, as a side window on a van or a vent in a building structure.

Referring to FIGS. 3 and 4, panel and hinge assembly 14 includes a frame unit 15 installed in opening 12 of roof 11. A panel unit 16 is pivotally connected to the frame unit 15 through a pair of hinge assemblies of the invention indicated generally at 18. Frame unit 15 includes a jamb frame or casement 19 mounted in circumscribing relationship to the lower edges of roof 11 which define opening 12. Casement 19 has a horizontal upper lip 20 located adjacent the lower edge of roof 11 that defines opening 12. A vertical wall 21 extends downward from lip 20 to a lower horizontal ledge 23 inwardly directed relative to the opening 12. A decorative U-shaped molding 24 covers the outer edge of ledge 23. Molding 24 describes the bounds of opening 12 as viewed from within the car. Molding 24 also engages the usual roof ticking 25 which extends up to the edge of the opening defined by molding 24 and conceals casement 19 from view.

A panel jamb 26 circumscribes that portion of the interior edge of roof 11 which defines opening 12 and is disposed in mating relationship relative to casement 19. Panel jamb 26 has an upper horizontal lip 28 which covers the edge of roof 11 such that the edge of roof 11 is disposed between the lip 28 of jamb 26 and the lip 20 of casement 19. Jamb 26 has a vertical body portion 29 and a lower leg 30 in contact with the ledge 23 of casement 19. Leg 30 has a vertical slot 31. A plurality of countersunk screws, as one shown at 32, are screwed through the ledge 23 of casement 19 and are threaded into the slot 31 of leg 30. Jamb 36 and casement 19 are thus retained in opening 12 by engagement of the edge of the roof 11.

Midway on the body portion 29 of jamb 26 is an arm or flange 34 inwardly extended relative to opening 12 and providing a ledge or seat for a weathertight type seal 35. Seal 35 is of rubber, plastic or the like and can be glued or otherwise suitably attached to the arm of 34 of jamb 26.

As shown, panel unit 16 is comprised as a window unit and includes a window frame 36 configured to be engageable with seal 35 in weathertight relationship thereto when in the closed configuration. A window pane 37 is held in window frame 36 by a lower hook-like extension 38 engaging the lower edge of window pane 37, and window molding 39 engaging the upper edge of pane 37. Molding 39 is secured in a slot in an adjacent portion of the window frame 36. Pane 37 can be heavy duty plastic, glass, a tinted lamenate of plastic and glass or the like. Pane 37 can be transparent, translucent, opaque or any combination thereof. For example, pane 37 can have an inside layer of clear glass secured to a layer of bronze tinted glass with a bronze tinted plastic laminate. The outside of the tinted glass has a metalic oxide coating.

Figure 5:
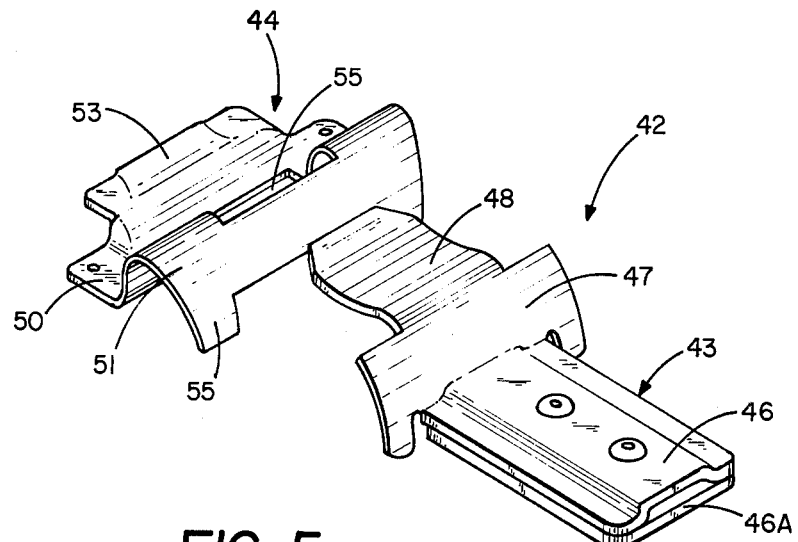
FIG. 5 is an exploded perspective view of a hinge of the hinge assembly of the present invention.
Figure 6:
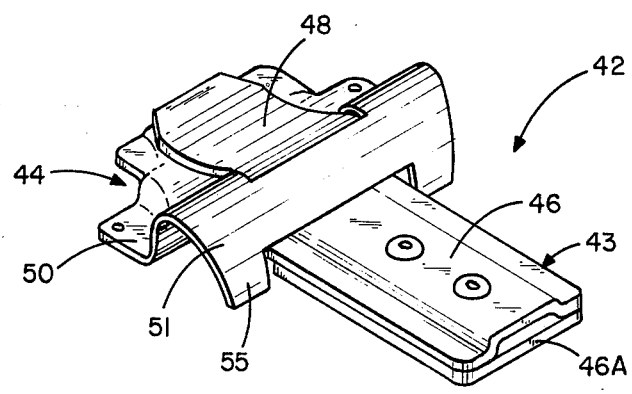
FIG. 6 is a perspective view of a hinge like that shown in FIG. 5 but in assembled relationship.

Window unit 16 is pivotally connected to frame unit 15 by a plurality of preferably two hinge assemblies 42, only one of which is shown in FIGS. 3 and 4. Hinge assembly 42 includes a first hinge member 43 connectable to window unit 16, and a second hinge member 44 connectable to the frame unit. Referring to FIGS. 5 and 6, hinge assembly 42 is shown in an inverted orientation from that shown in FIGS. 3 and 4 for purposes of illustration. First hinge member 43 includes a mounting plate 46. An arcuate shoulder 47 is connected to mounting plate 46, and a tongue 48 extends from the shoulder 47. Second hinge member 44 includes a base 50 and an arcuate yoke 51 extended therefrom. Base 50 includes a raised curved platform 53 located behind yoke 51. Yoke 51 has an opening 54 for receipt of the tongue 48 of the first hinge member 43. Tongue 48 is insertable through opening 54 of yoke 51 to bear upon the platform 53. Yoke 51 has a curved front wall 55 which covers the shoulder 47 of first hinge member 43 when the tongue is inserted through opening 54. The interior curvature of wall 55 of yoke 51 is substantially the same as the outer curvature of shoulder 47 whereby shoulder 47 and the wall 54 bear together and are slidably moveable with respect to each other upon opening and closing of hinge 42. The bearing surfaces of each hinge member are orientated to face in generally opposite directions. In assembled relationship, as shown in FIG. 6, the bearing surface provided by tongue 48 is located on the opposite side of first hinge member 43 relative to the bearing surface provided by curved shoulder 47. Likewise, the bearing surface of raised platform 53 is located on the opposite side of second hinge member 44 with respect to the bearing surface of interior curved wall 55 of yoke 51.

Referring again to FIGS. 3 and 4, first hinge member 43 is fastened by screws 57 passing through mounting plate 46, a block 46A, to window pane 37. Block 46A is secured to the inside of pane 37 with bonding material or adhesive. Second hinge member 44 is fastened by screws 58 through base 50 to the lower portion of body portion 29 of jamb 26 at a location where the leg 30 is interrupted. Tongue 48 passes through opening 54 of yoke 51 and bears upon curved platform 53 of second hinge member 44. Shoulder 47 of first hinge member 43 and front wall 55 of yoke 51 are in bearing relationship under the weight of window unit 16. In moving between the closed position of FIG. 3 and the open position of FIG. 4, front wall 55 of yoke 51 slides on the shoulder 47, and the end of tongue 48 slides on the curved platform 53. Pivotal movement is about an axis remote from the hinge assembly, and removed from the window unit, the location of the axis being determined by the curvature of the shoulder and the front wall 55 and the platform 53. In going from the closed to open position, window frame 36 lifts off of and away from seal 35.

A latch mechanism 60 is operable to open and close window unit 16. Latch mechanism 60 is located at the edge of window unit 16 opposite the hinge assemblies 42. A latch handle 61 is rotatable in a handle guide 62 to raise and lower a toggle linkage 63 in usual fashion. The bracket 64 is fastened to window unit 16 near the edge thereof and carries a pin 65. The end of toggle linkage 63 engages the pin 65 to raise and lower the edge of window unit 16 when the toggle linkage 63 is raised and lowered. Toggle linkage 63 is readily disengageable from pin 65 whereby unit 16 can be removed from the frame unit 15 simply by disengagement by the tongue 48 of the first hinge members from the opening 54 in the yoke 51 of the second hinge members.

In use, hinge assembly 42 is concealed from view. It permits opening and closing of window unit 16 without interference with jamb seal 35. The hinge assembly permits ready removal of unit 16 from the frame unit 15 after the toggle linkage 63 is disengaged from pin 65. The window unit is pivoted upward and raised to disengage the hinge assemblies.

While there has been shown and described a perferred embodiment of a panel and hinge assembly, it will be apparent that changes in deviations in the embodiment shown can be had without departing from the scope and spirit of the invention.

The embodiments of the invention in which an exclusive property or privilege is claimed are defined as follows:

1. A panel and hinge assembly comprising:
a panel unit;
frame means defining an opening;
hinge means pivotally connecting the panel unit to the frame means for movement between a closed position covering the opening and an open position clear of the opening;
said hinge means including at least one hinge assembly;
said hinge assembly having a first hinge member and a second member;
one hinge member being connected to the panel unit and the other to the frame means;
said first hinge member having an arcuate shoulder and a tongue extended away from the shoulder providing bearing surfaces for the first hinge member located on opposite sides of the first hinge member from one another to be orientated to face in generally opposite directions;
said second hinge member having an arcuate yoke portion and a curved platform providing bearing surfaces for the second hinge member located on opposite sides of the second hinge member from one another to be orientated to face in generally opposite directions;
the arcuate yoke portion of the second hinge member having an opening;
said first and second hinge members being in assembled relationship with said tongue of the first hinge member extending through the opening of the arcuate yoke portion to bear upon the curved platform in sliding bearing engagement with said curved platform of the second hinge member, said shoulder of the first hinge member being in sliding engagement with the arcuate yoke portion of the second hinge member.

2. The panel and hinge assembly of claim 1 wherein:
said yoke portion has a bearing surface comprised as a curved interior wall;
said shoulder having a bearing surface comprised as a curved exterior wall in bearing, slidable engagement with the curved interior wall of the yoke portion and substantially of the same curvature thereof whereby rotation of the panel unit relative to the frame means is about an axis remote from the hinge means.

3. The panel and hinge assembly of claim 2 wherein:
said frame means includes a jamb having a flange inwardly extended with respect to said opening, and a weather seal secured on said flange for sealing receipt of the panel unit in the closed position.

4. The panel and hinge assembly of claim 3 including:
latch means connected between said panel unit and said frame means opposite the hinge means able to latch the panel unit in a closed position relative to the frame means and adapted to be released to permit opening of the panel unit relative to the frame means by pivotable movement about the hinge means.

5. A hinge assembly for movably connecting a panel unit to a support comprising:
a first hinge member adapted to be connected to the panel unit;
a second hinge member adapted to be connected to the support;
said first hinge member having arcuate shoulder means and tongue means extended away from the shoulder means;
said second hinge member having an arcuate yoke portion and a platform;
said first and second hinge member being in assembled relationship with the tongue means of the first hinge member in sliding bearing engagement with said platform of the second hinge member, and said shoulder means of the first hinge member located in sliding bearing engagement with the arcuate yoke portion of the second hinge member.

6. The hinge assembly of claim 5 wherein:
the arcuate shoulder means has a curvature in a first direction and said tongue means has an arcuate curvature in a second direction opposite the first direction.

7. The hinge assembly of claim 6 wherein:
the arcuate yoke portion and platform are curved in the same direction as the first direction of the shoulder means.

8. The hinge assembly of claim 5 wherein:
said yoke portion of the second hinge member has an opening;
said tongue of the first hinge member extending through the opening to bear upon the platform of the second hinge member.

9. The hinge assembly of claim 5 wherein:
said tongue means and shoulder means of the first hinge member provide bearing surfaces for the first hinge member located on opposite sides of the first hinge member from one another to be orientated face in generally opposite directions;
said arcuate yoke portion and tongue means providing bearing surfaces for the second hinge member located on opposite sides of the second hinge member from one another to be orientated to face in generally opposite directions.

10. The hinge assembly of claim 9 wherein:
the arcuate yoke portion of the second member has an opening;
said tongue means of the first hinge member extending through the opening to bear upon the platform of the second hinge member.

11. The hinge assembly of claim 10 wherein:
said yoke portion has a bearing surface comprised as a curved interior wall;
said shoulder means having a bearing surface comprised as a curved exterior wall in bearing, slidable engagement with the curved interior wall of the yoke portion and substantially of the same curvature thereof whereby rotation of the panel unit relative to support is about an axis remote from the hinge assembly.

12. The hinge assembly of claim 5 including:
a panel unit;
frame means defining an opening;
one hinge member connected to the panel unit and the other hinge member connected to the frame means for movement of the panel unit between a closed position covering the opening of the frame means and an open position clear of the opening.

13. The hinge assembly of claim 12 wherein:
said yoke portion of the second hinge member has an opening;
said tongue of the first hinge member extending through the opening to bear upon the curved platform of the second hinge member.

14. The hinge assembly of claim 13 wherein:
said tongue is removable from the opening of the yoke of the second hinge member to enable removal of the panel unit from the frame means.

15. The hinge assembly of claim 14 wherein:
said panel unit includes a window.

16. The hinge assembly of claim 12 wherein:
said tongue and shoulder of the first hinge member provide bearing surfaces for the first hinge member located on opposite sides of the first hinge member from one another to be orientated to face in generally opposite directions;
said arcuate yoke portion and curved platform providing bearing surfaces for the second hinge member located on opposite sides of the second hinge member from one another to be orientated to face in generally opposite directions.

* * * * *